(12) United States Patent
Ghosh

(10) Patent No.: US 11,971,855 B2
(45) Date of Patent: Apr. 30, 2024

(54) SUPPORTING MULTIPLE OPERATIONS IN TRANSACTION LOGGING FOR A CLOUD-ENABLED FILE SYSTEM

(71) Applicant: EMC IP Holding Company LLC, Hopkinton, MA (US)

(72) Inventor: Priyamrita Ghosh, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 239 days.

(21) Appl. No.: 16/878,269

(22) Filed: May 19, 2020

(65) Prior Publication Data
US 2021/0365412 A1 Nov. 25, 2021

(51) Int. Cl.
*G06F 16/17* (2019.01)
*G06F 16/18* (2019.01)
*G06F 16/182* (2019.01)

(52) U.S. Cl.
CPC ........ *G06F 16/1734* (2019.01); *G06F 16/183* (2019.01); *G06F 16/1865* (2019.01)

(58) Field of Classification Search
CPC . G06F 16/1734; G06F 16/183; G06F 16/1865
See application file for complete search history.

(56) References Cited

U.S. PATENT DOCUMENTS

| | | | | |
|---|---|---|---|---|
| 5,870,757 A * | 2/1999 | Fuller | ................ | G06F 16/1815 |
| 6,732,124 B1 * | 5/2004 | Koseki | ............... | G06F 12/0868 |
| | | | | 711/119 |
| 7,185,005 B1 * | 2/2007 | Long | ....................... | H04L 9/40 |
| | | | | 707/999.009 |
| 7,685,177 B1 * | 3/2010 | Hagerstrom | ........ | G06F 16/1744 |
| | | | | 707/999.204 |
| 8,156,306 B1 * | 4/2012 | Raizen | ................. | G06F 3/0641 |
| | | | | 711/202 |
| 8,676,851 B1 * | 3/2014 | Nesbit | ................ | G06F 16/1774 |
| | | | | 707/791 |

(Continued)

OTHER PUBLICATIONS

Dell Inc., Dell EMC Unity: Cloud Tiering Appliance (CTA), available at https://www.dellemc.com/fr-mg/collaterals/unauth/white-papers/solutions/h16376-dell-emc-unity-cloud-tiering-appliance.pdf, Mar. 2019.

(Continued)

*Primary Examiner* — Pierre M Vital
*Assistant Examiner* — Andrew N Ho
(74) *Attorney, Agent, or Firm* — Ryan, Mason & Lewis, LLP

(57) ABSTRACT

Methods, apparatus, and processor-readable storage media for supporting multiple operations in transaction logging for a cloud enabled file system are provided herein. An example computer-implemented method includes obtaining a plurality of file system operations to be performed on a cloud enabled file system; executing the plurality of file system operations as a single file system transaction; and maintaining a transaction log for the single transaction, the transaction log comprising information for one or more sub-transactions that were completed in conjunction with said executing, wherein the one or more sub-transactions correspond to at least a portion of the plurality of file system operations.

20 Claims, 6 Drawing Sheets

(56) References Cited

U.S. PATENT DOCUMENTS

| | | | | |
|---|---|---|---|---|
| 8,762,347 | B1* | 6/2014 | Gokhale | G06F 16/1865 |
| | | | | 707/649 |
| 8,977,827 | B1* | 3/2015 | Sims | G06F 11/1456 |
| | | | | 711/162 |
| 9,021,303 | B1* | 4/2015 | DeSouter | G06F 11/1474 |
| | | | | 714/15 |
| 9,305,071 | B1* | 4/2016 | Bono | G06F 16/119 |
| 9,311,333 | B1* | 4/2016 | Pawar | G06F 16/1865 |
| 9,418,100 | B1* | 8/2016 | Sethi | G06F 16/1865 |
| 9,442,955 | B1* | 9/2016 | Pawar | G06F 16/1865 |
| 9,503,542 | B1* | 11/2016 | Wang | H04L 67/06 |
| 9,697,219 | B1* | 7/2017 | Wang | G06F 3/0619 |
| 2004/0210583 | A1* | 10/2004 | Enko | G06F 16/10 |
| 2011/0246416 | A1* | 10/2011 | Prahlad | G06F 16/1734 |
| | | | | 707/610 |
| 2019/0108341 | A1* | 4/2019 | Bedhapudi | G06F 16/1752 |

OTHER PUBLICATIONS

Oracle Corporation, System Administration Guide: Devices and File Systems, Chapter 16, available at https://docs.oracle.com/cd/E19253-01/817-5093/6mkisoqcn/index.html, accessed Apr. 11, 2020.

* cited by examiner

SUPPORTING MULTIPLE OPERATIONS IN TRANSACTION LOGGING FOR A CLOUD-ENABLED FILE SYSTEM

FIELD

The field relates generally to information processing systems, and more particularly to file systems in such systems.

BACKGROUND

Generally, a file system controls how data is stored and retrieved in a storage system. Some file systems (such as, for example, a UFS64 file system) include logging features that bundle multiple metadata changes that comprise a complete file system operation into a transaction. Sets of transactions are recorded in a log, for example, on a storage disk. Then, the sets of transactions are applied to the metadata of the file system.

When rebooting, the system discards incomplete transactions and applies the transactions for completed transactions. The file system remains consistent because only completed transactions have been applied. This consistency remains even when a system crashes.

Currently, logging is done for a single file system operation, such as, for example, creation of a file or directory, deletion of a file or directory, or renaming a file or directory. Multiple file system operations (for instance, a combination of single file system operations) are typically not executed in a single transactional log. In such situations, a system crash may introduce inconsistencies into the file system such as, for example, when only a portion of these multiple operations is completed.

A need exists to support multiple file system operations in a single transactional log.

SUMMARY

Illustrative embodiments of the disclosure provide techniques supporting multiple operations in transaction logging for a cloud-enabled file system. An exemplary computer-implemented method includes obtaining a sequence of file system operations to be performed on a cloud-enabled file system; executing the sequence of file system operations as a single file system transaction; and maintaining a transaction log for the single transaction, the transaction log comprising information for one or more sub-transactions that were completed in conjunction with said executing, wherein the one or more sub-transactions correspond to at least a portion of the file system operations in the sequence.

Illustrative embodiments can provide significant advantages relative to conventional file system logging techniques. For example, challenges associated with failures or panics resulting from multiple file system operations are overcome in one or more embodiments by combining multiple file system operations into a single logging transaction.

These and other illustrative embodiments described herein include, without limitation, methods, apparatus, systems, and computer program products comprising processor-readable storage media.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

Figure 1:
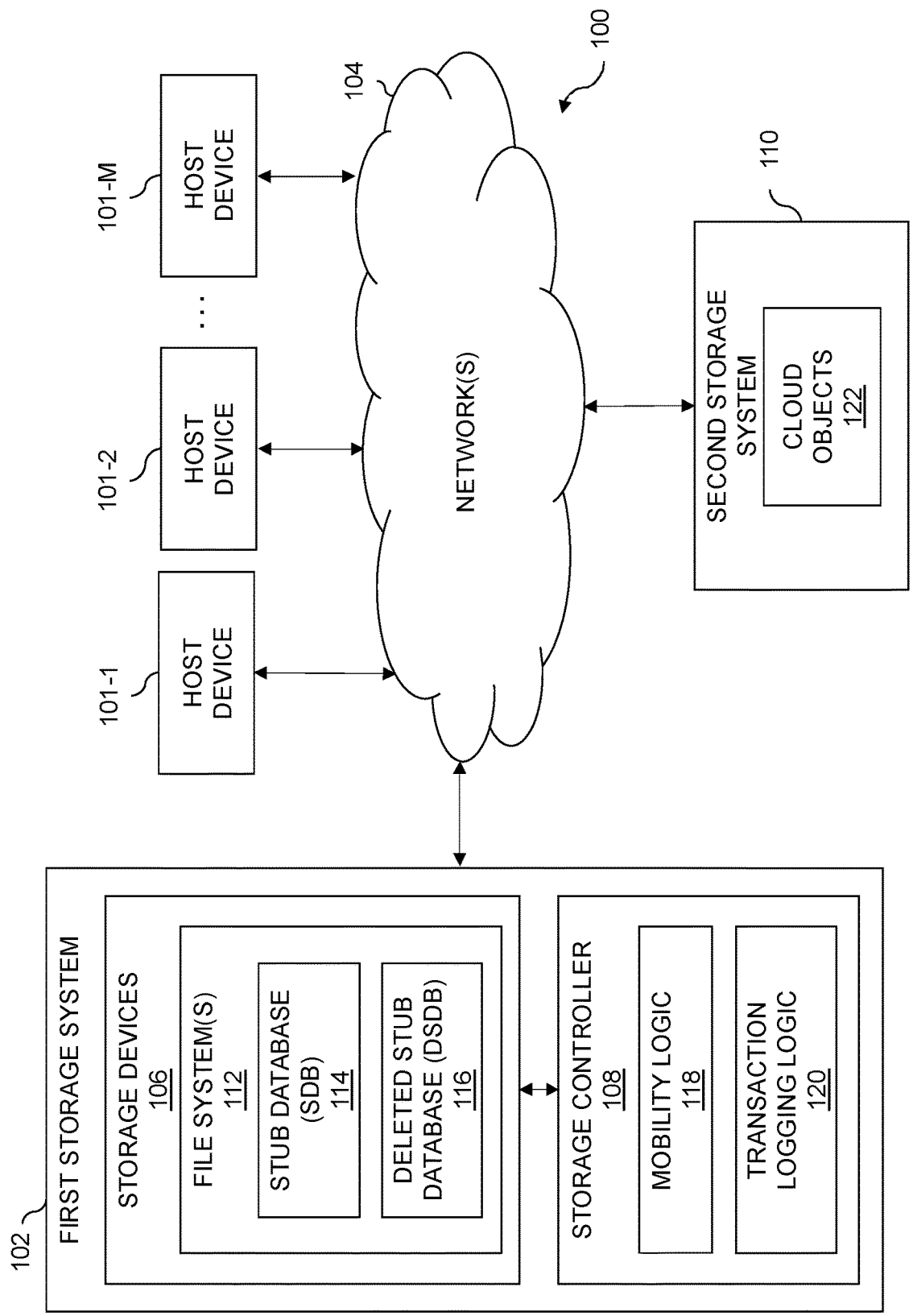
FIG. 1 shows an information processing system configured for supporting multiple operations in transaction logging for a cloud-enabled file system in an illustrative embodiment.

FIG. 1 shows an information processing system 100 configured in accordance with an illustrative embodiment. The information processing system 100 comprises a plurality of host devices 101-1, 101-2, . . . 101-M, collectively referred to herein as host devices 101, and a first storage system 102. The host devices 101 are configured to communicate with the first storage system 102 over a network 104. Also, shown in FIG. 1 is a second storage system 110, which in at least some embodiments corresponds to a cloud storage system that, optionally, stores cloud objects 122.

The host devices 101 illustratively comprise servers or other types of computers of an enterprise computer system, cloud-based computer system or other arrangement of multiple compute nodes associated with respective users.

For example, the host devices 101 in some embodiments illustratively provide compute services such as execution of one or more applications on behalf of each of one or more users associated with respective ones of the host devices. Such applications illustratively generate input-output (IO) operations that are processed by the first storage system 102. The term "input-output" as used herein refers to at least one of input and output. For example, IO operations may comprise write requests and/or read requests directed to logical addresses of a particular logical storage volume of the first storage system 102. These and other types of IO operations are also generally referred to herein as IO requests.

The first storage system 102 illustratively comprises processing devices of one or more processing platforms. For example, the first storage system 102 can comprise one or more processing devices each having a processor and a memory, possibly implementing virtual machines and/or containers, although numerous other configurations are possible.

The first storage system 102 can additionally or alternatively be part of a cloud infrastructure such as an Amazon Web Services (AWS) system. Other examples of cloud-based systems that can be used to provide at least portions of the first storage system 102 include Google Cloud Platform (GCP) and Microsoft Azure.

The host devices 101 and the first storage system 102 may be implemented on a common processing platform, or on separate processing platforms. The host devices 101 are illustratively configured to write data to and read data from the first storage system 102 in accordance with applications executing on those host devices for system users.

The term "user" herein is intended to be broadly construed so as to encompass numerous arrangements of human, hardware, software or firmware entities, as well as combinations of such entities. Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The first storage system 102 comprises a plurality of storage devices 106 and an associated storage controller 108. The storage devices 106 store data of a plurality of storage volumes. For example, the storage volumes may illustratively comprise respective logical units (LUNs) or other types of logical storage volumes. The term "storage volume" as used herein is intended to be broadly construed, and should not be viewed as being limited to any particular format or configuration.

The storage devices 106 of the first storage system 102 illustratively comprise solid state drives (SSDs). Such SSDs are implemented using non-volatile memory (NVM) devices such as flash memory. Other types of NVM devices that can be used to implement at least a portion of the storage devices 106 include non-volatile RAM (NVRAM), phase-change RAM (PC-RAM), magnetic RAM (MRAM), resistive RAM, spin torque transfer magneto-resistive RAM (STT-MRAM), and Intel Optane™ devices based on 3D XPoint™ memory. These and various combinations of multiple different types of NVM devices may also be used. For example, hard disk drives (HDDs) can be used in combination with or in place of SSDs or other types of NVM devices in the first storage system 102.

It is therefore to be appreciated numerous different types of storage devices 106 can be used in first storage system 102 in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises HDDs. The particular storage devices used in a given storage tier may be varied in other embodiments, and multiple distinct storage device types may be used within a single storage tier. The term "storage device" as used herein is intended to be broadly construed, so as to encompass, for example, SSDs, HDDs, flash drives, hybrid drives or other types of storage devices.

In the FIG. 1 embodiment, the first storage system 102 includes at least one file system 112. In some exemplary embodiments, one or more of the host devices 101 may also include at least one file system. The term "file system" as used herein is intended to be broadly construed, and is not intended to be limited to any particular device or configuration. As depicted in FIG. 1, the at least one file system 112 includes a stub database (SDB) 114 and a deleted stub database (DSDB) 116. According to exemplary embodiments, the SDB 114 and the DSDB 116 are maintained to enable integration of the file system 112 with the second storage system 110. In such embodiments, this allows the file system 112 to be cloud-enabled, as described in more detail herein. In at least one example embodiment, the SDB 114 and the DSDB 116 may be implemented as hidden directories, within the file system 112.

The SDB 114 includes data pertaining to hard links of stubbed files of the file system 102. Generally, once a file has been sent from the first storage system 112 to the second storage system 110, a stub file is created in the SDB 114 that acts as pointer to a cloud address of one of the cloud objects 122 that stores the data of the file. The DSDB 116 stores hard links of deleted stubbed files and/or rehydrated stubbed files. The SDB 114 and the DSDB 116 may be maintained at least in part by mobility logic 118 and transaction logging logic 120 of storage controller 108 as described in more detail elsewhere herein.

In some embodiments, the first storage system 102 illustratively comprises a scale-out all-flash distributed content addressable storage (CAS) system, such as an XtremIO™ storage array from Dell EMC of Hopkinton, Massachusetts A wide variety of other types of distributed or non-distributed storage arrays can be used in implementing the first storage system 102 in other embodiments, including by way of example one or more VNX®, VMAX®, Unity™ or PowerMax™ storage arrays, commercially available from Dell EMC. Additional or alternative types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

The term "storage system" as used herein is therefore intended to be broadly construed, and should not be viewed as being limited to particular storage system types, such as, for example, CAS systems, distributed storage systems, or storage systems based on flash memory or other types of NVM storage devices. A given storage system as the term is broadly used herein can comprise, for example, any type of system comprising multiple storage devices, such as NAS, storage area networks (SANs), direct-attached storage (DAS) and distributed DAS, as well as combinations of these and other storage types, including software-defined storage.

In some embodiments, communications between the host devices 101 and the first storage system 102 comprise Small Computer System Interface (SCSI) or Internet SCSI (iSCSI) commands. Other types of SCSI or non-SCSI commands may be used in other embodiments, including commands that are part of a standard command set, or custom commands such as a "vendor unique command" or VU command that is not part of a standard command set. The term "command" as used herein is therefore intended to be broadly construed, so as to encompass, for example, a composite command that comprises a combination of multiple individual commands. Numerous other commands can be used in other embodiments.

For example, although in some embodiments certain commands used by the host devices 101 to communicate with the first storage system 102 illustratively comprise SCSI or iSCSI commands, other embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF, and NVMe over Transmission Control Protocol (TCP), also referred to as NVMe/TCP.

The host devices 101 are configured to interact over the network 104 with the first storage system 102. Such interaction illustratively includes generating IO operations, such as write and read requests, and sending such requests over the network 104 for processing by the first storage system 102. In some embodiments, each of the host devices 101 comprises a multi-path input-output (MPIO) driver configured to control delivery of IO operations from the host device to the first storage system 102 over selected ones of a plurality of paths through the network 104. The paths are illustratively associated with respective initiator-target pairs, with each of a plurality of initiators of the initiator-target pairs comprising a corresponding host bus adaptor (HBA) of the host device, and each of a plurality of targets of the initiator-target pairs comprising a corresponding port of the first storage system 102.

The MPIO driver may comprise, for example, an otherwise conventional MPIO driver, such as a PowerPath® driver from Dell EMC. Other types of MPIO drivers from other driver vendors may be used.

The storage controller 108 of first storage system 102 in the FIG. 1 embodiment includes mobility logic 118 and transaction logging logic 120. Functionality for supporting multiple operations in transaction logging for a cloud-enabled file system in the first storage system 102 is illustratively performed at least in part by the storage controller 108, utilizing its mobility logic 118 and/or its transaction logging logic 120, in a manner to be described in more detail elsewhere herein.

The storage controller 108 and the first storage system 102 may further include one or more additional modules and other components typically found in conventional implementations of storage controllers and storage systems, although such additional modules and other components are omitted from the figure for clarity and simplicity of illustration.

The first storage system 102 in some embodiments is implemented as a distributed storage system, also referred to herein as a clustered storage system, comprising a plurality of storage nodes. Each of at least a subset of the storage nodes illustratively comprises a set of processing modules configured to communicate with corresponding sets of processing modules on other ones of the storage nodes. The sets of processing modules of the storage nodes of the first storage system 102 in such an embodiment collectively comprise at least a portion of the storage controller 108 of the first storage system 102. For example, in some embodiments the sets of processing modules of the storage nodes collectively comprise a distributed storage controller of the distributed first storage system 102. A "distributed storage system" as that term is broadly used herein is intended to encompass any storage system that, like the first storage system 102, is distributed across multiple storage nodes.

It is assumed in some embodiments that the processing modules of a distributed implementation of storage controller 108 are interconnected in a full mesh network, such that a process of one of the processing modules can communicate with processes of any of the other processing modules. Commands issued by the processes can include, for example, remote procedure calls (RPCs) directed to other ones of the processes.

The sets of processing modules of a distributed storage controller illustratively comprise control modules, data modules, routing modules and at least one management module. Again, these and possibly other modules of a distributed storage controller are interconnected in the full mesh network, such that each of the modules can communicate with each of the other modules, although other types of networks and different module interconnection arrangements can be used in other embodiments.

The management module of the distributed storage controller in this embodiment may more particularly comprise a system-wide management module. Other embodiments can include multiple instances of the management module implemented on different ones of the storage nodes. It is therefore assumed that the distributed storage controller comprises one or more management modules.

A wide variety of alternative configurations of nodes and processing modules are possible in other embodiments. Also, the term "storage node" as used herein is intended to be broadly construed, and may comprise a node that implements storage control functionality but does not necessarily incorporate storage devices.

Communication links may be established between the various processing modules of the distributed storage controller using well-known communication protocols such as TCP/IP and remote direct memory access (RDMA). For example, respective sets of IP links used in data transfer and corresponding messaging could be associated with respective different ones of the routing modules.

Each storage node of a distributed implementation of first storage system 102 illustratively comprises a CPU or other type of processor, a memory, a network interface card (NIC) or other type of network interface, and a subset of the storage devices 106, possibly arranged as part of a disk array enclosure (DAE) of the storage node. These and other references to "disks" herein are intended to refer generally to storage devices, including SSDs, and should therefore not be viewed as limited to spinning magnetic media.

The first storage system 102 in the FIG. 1 embodiment is assumed to be implemented using at least one processing platform, with each such processing platform comprising one or more processing devices, and each such processing device comprising a processor coupled to a memory. Such processing devices can illustratively include particular arrangements of compute, storage and network resources. As indicated previously, the host devices 101 may be implemented in whole or in part on the same processing platform as the first storage system 102 or on a separate processing platform.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the host devices 101 and the first storage system 102 to reside in different data centers. Numerous other distributed implementations of the host devices and the first storage system 102 are possible.

In some example embodiments, the second storage system 110 may correspond to a cloud storage system and may be implemented in a similar manner as the first storage system 102. For example, in at least one example embodiment, the first storage system 102 may relate to a local storage system (such as, for example, a NAS storage system), and the second storage system 110 may relate to one or more cloud storage systems (such as, for example, storage systems corresponding to Elastic Cloud Storage (ECS), GCP, AWS, and Microsoft Azure).

Additional examples of processing platforms utilized to implement host devices 101, the first storage system 102, and the second storage system 110 in illustrative embodiments will be described in more detail below in conjunction with FIGS. 5 and 6.

It is to be appreciated that these and other features of illustrative embodiments are presented by way of example only, and should not be construed as limiting in any way.

Accordingly, different numbers, types and arrangements of system components such as host devices 101, first storage system 102, network 104, storage devices 106, storage controller 108, second storage system 110, mobility logic 118, and transaction logging logic 120 can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

An exemplary process utilizing mobility logic 118 and transaction logging logic 120 will be described in more detail with reference to the flow diagram of FIG. 4.

As noted above, some file systems include logging features that bundle multiple metadata changes that comprise a complete file system operation into a transaction. Sets of such transactions are recorded in an on-disk log, which are then applied to the metadata of the actual file system.

Figure 2:
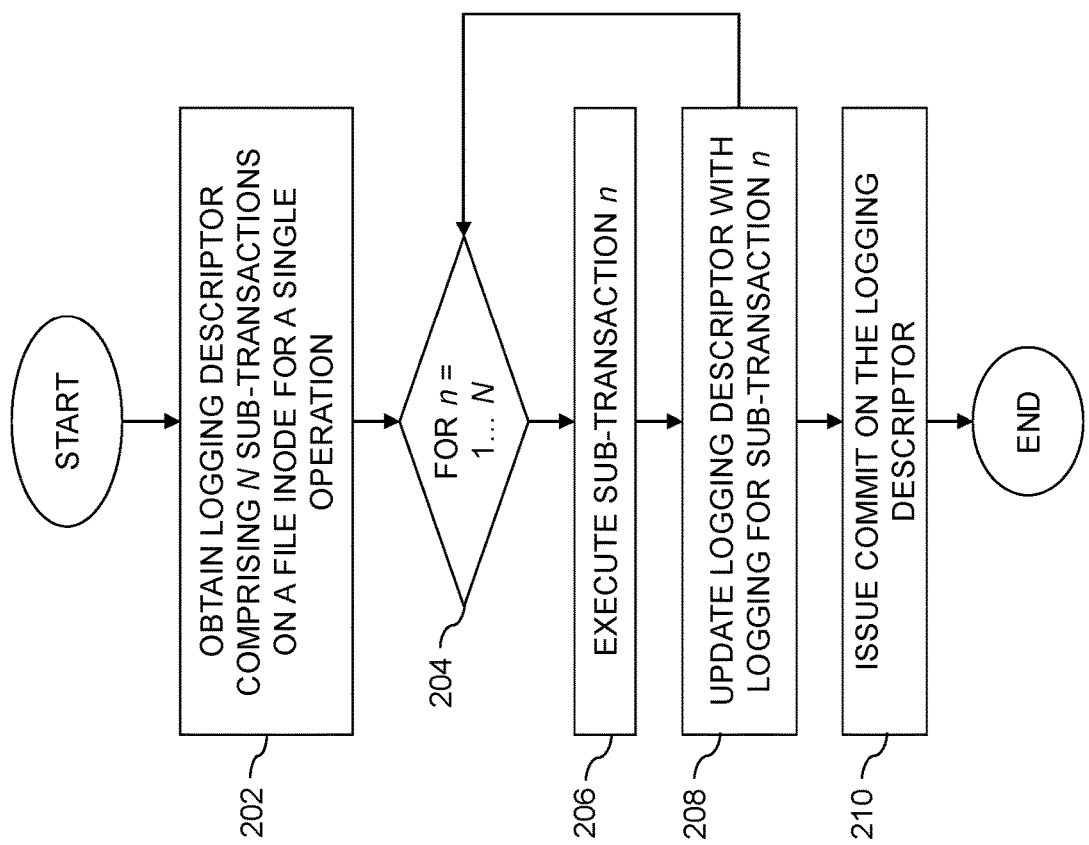
FIG. 2 shows an example of a logging process for a single operation in an illustrative embodiment.

FIG. 2 shows a process flow diagram for a single file system operation in accordance with exemplary embodiments. Step 202 of the transaction logging process depicted in FIG. 2 includes obtaining a logging descriptor (e.g., a UFS logging descriptor) comprising a number, N, sub-transactions for a single operation. Step 204 performs a for-loop operation for the N sub-transactions, namely, for each sub-transaction n, where n=1 . . . N, steps 206-208 are performed. Step 206 includes executing the respective sub-transaction n, and step 208 includes updating the logging descriptor with logging information for sub-transaction n. After all of the N sub-transactions are executed, step 210 includes issuing a commit based on the logging descriptor.

By way of example, consider a file system operation corresponding to a remove operation (i.e., an operation that deletes a file from a directory in a file system). The logging descriptor is set to a "remove" transaction type. The one or more sub-transactions within this transaction may be performed on the metadata of an inode (i.e., a data structure that stores metadata of a file or directory in the file system). As such, the log entry type for the remove operation is an "inode" log entry type. Those skilled in the art will appreciate that, in other examples, the sub-transaction may be performed on, for example, other objects of the file system (such as, for example, direct blocks, indirect blocks, access control lists (ACLs), a quota, and/or the like), and the log entry type will be set accordingly. A commit operation is then issued on the logging descriptor indicating that the remove operation is completed.

In some example embodiments, files on a local storage array (e.g., first storage system 102) are sent to cloud object storage (e.g., second storage system 110) based on one or more user defined policies via virtualization software running on a storage array platform. The virtualization software (also referred to herein as "mobility software") may be implemented at least in part by mobility logic 118. The mobility software includes functionality to allow the local storage array to access these cloud files and to rehydrate any of these files back to the local storage array platform's file storage through a copy mechanism. The term "rehydrate" as used herein generally refers to any operation which reverses the process that is performed when transferring a file to cloud object storage, such as, for example, an operation which reconstitutes a file on the local storage system based on corresponding data in cloud object storage. When a file is sent to cloud object storage, a local stub file is created on the local storage array, which acts as a pointer to a cloud address.

Additionally, the local storage array may be configured to capture snapshots of the file system, for example, on a periodic basis or in response to an event such as, for example, a user request. As such, the file system may be associated with a plurality of different snapshots, wherein each of the snapshots is associated with a time the snapshot was created. The file system may be restored to the creation time corresponding to one of these snapshots by performing a snapshot restore operation.

According to one or more example embodiments, the integration of such mobility software with a local storage system (for example, a NAS) that includes a file system may be implemented by creating and maintaining an SDB and a DSDB in the file system. As noted above, the SDB may store hard links of stubbed files (e.g., that are created by the mobility software), and the DSDB may store hard links for deleted and/or rehydrated stubbed files in the file system. When handling the deletion and/or rehydration of the stubbed files in such situations, multiple operations need to be performed on the inode of the stubbed file (that is present in the SDB) in a single file system transaction (e.g., a single UFS64 transaction). One or more example embodiments allow file system logging for multiple operations to occur in a single transaction to handle such situations.

Figure 3:
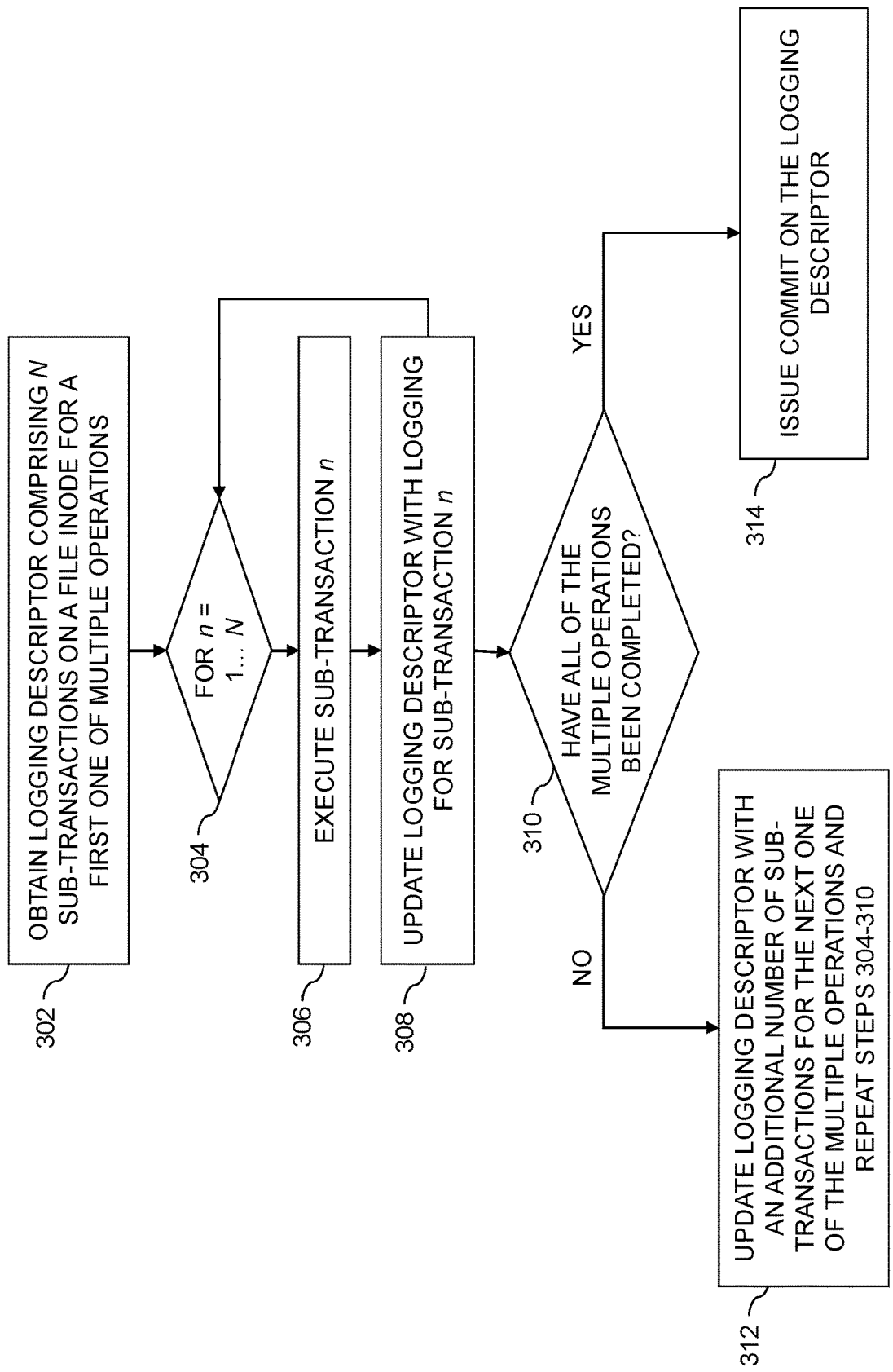
FIG. 3 shows an example of a logging process for multiple operations in an illustrative embodiment.

FIG. 3 shows an example of a logging process for multiple operations in an illustrative embodiment. The process in FIG. 3 may be used, for example, when operations are performed in cloud-enabled file systems. Step 302 includes obtaining a logging descriptor for a first one of the multiple operations, wherein the first operation comprises a number, N, of sub-transactions. Steps 304-308 are performed in a similar manner as step 204-208 as described above in conjunction with FIG. 2. After all of the sub-transactions are executed for the first one of the operations, step 310 includes checking whether all of the multiple operations have been completed.

If the result of step 310 is no, then the process continues to step 312. Step 312 includes updating the logging descriptor with an additional number of sub-transactions for the next one of the multiple operations, then repeating steps 304-310 for the next one of the multiple operations.

If the result of step 310 is yes (i.e., all of the multiple operations have been completed), then the process continues to step 314. Step 314 includes issuing a commit on the logging descriptor.

Non-limiting examples of use cases involving such a logging process for performing multiple operations in a single transaction are described in more detail below.

A first example use case includes deleting a stubbed file from an SDB (e.g., stubbed using the mobility software) of the file system. The multiple operations in this example (which take place in a single transaction) include:
1. Allocating a logging descriptor for the transaction;
2. Updating the deletion time in the offline metadata of the inode of the stubbed file;
3. Moving the hard link (corresponding to the stubbed file to be deleted) from the SDB to the DSDB; and
4. Deleting the original stubbed file from the file system.

Another example use case includes rehydrating a stubbed file in the file system from secondary storage (e.g., cloud storage). For example, the file may have been stubbed using mobility software. The multiple operations in this example (which take place in a single transaction) include:
1. Allocating a logging descriptor for the transaction;
2. Updating the delete time of the offline metadata of the stubbed file inode;
3. Creating a new inode using the properties of the stubbed file inode (i.e., the one that is going to be rehydrated);
4. Setting the new inode as an offline inode;
5. Copying the offline metadata from the stubbed inode to the new inode metadata;
6. Creating a hard link in the DSDB for this newly created inode; and
7. Deleting the hard link, corresponding to the stubbed file which is going to be rehydrated, from the Stub Hard Link Database (SHLDB).

A third example of a use case involves execution of an orphan management job on orphaned files in the file system after a snapshot restore operation is performed on the file system. It is noted that orphaned files refer to files in a file system which have a corresponding object in the cloud, but where there is no corresponding stub file in the file system. The multiple operations in this example (which take place in a single transaction) include:

1. Allocating a logging descriptor for the transaction;
2. Removing the existing inode if an entry with the same name (e.g., the same globally unique identifier (GUID)) as that of the stubbed file inode is already present in the DSDB;
3. Updating the delete time of the offline metadata of the stubbed file inode which is present in the internal cloud mobility snapshot created before the Snapshot Restore process;
4. Creating a new inode using the properties of the stubbed file inode;
5. Setting the new inode as an offline inode;
6. Copying the offline metadata from the stubbed inode to the new inode metadata; and
7. Creating a hard link in the DSDB for this newly created inode.

It is again noted that in each of the above-use cases, all of the multiple operations are performed as part of a single transaction. Accordingly, if a failure and/or panic were to occur during any of these operations, then the entire transaction will be considered incomplete. Such an incomplete transaction will be discarded when the system recovers or reboots, thereby avoiding inconsistencies in the file system.

Figure 4:
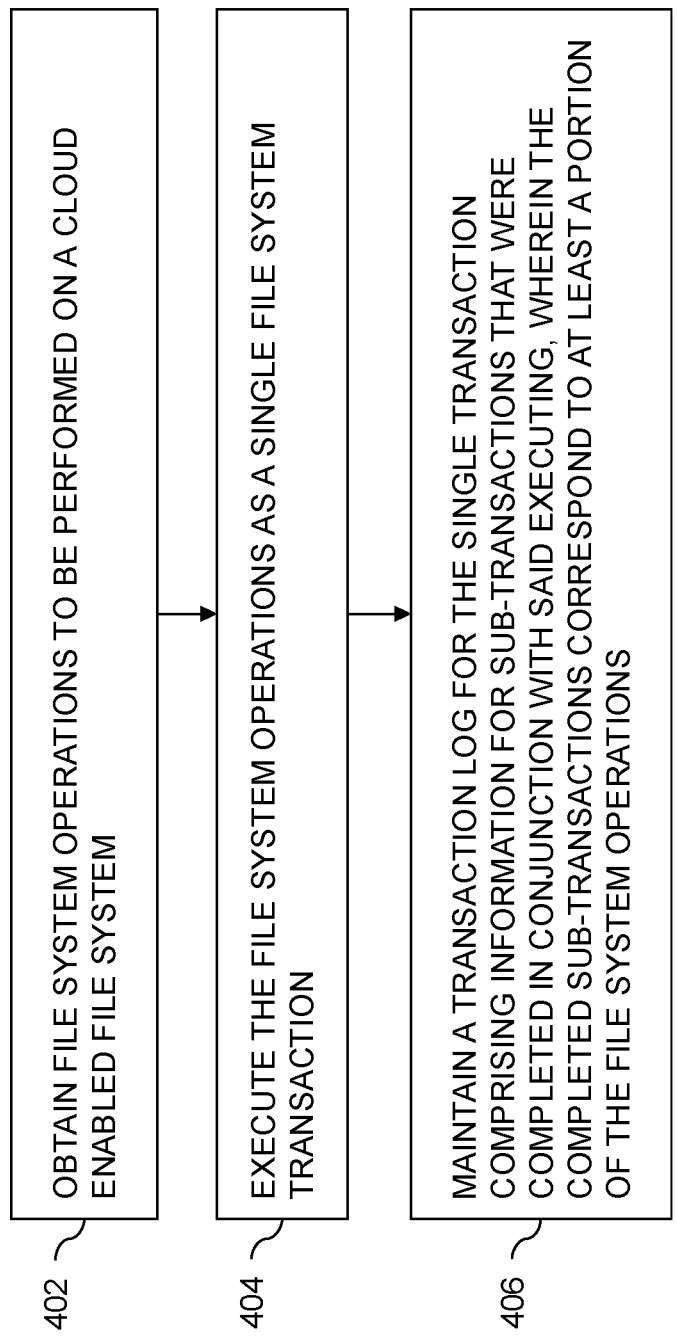
FIG. 4 shows an example of a process for supporting multiple operations in transaction logging for a cloud-enabled file system in an illustrative embodiment.

FIG. 4 shows an example of a process for supporting multiple operations in transaction logging for a cloud-enabled file system in illustrative embodiments. It is to be understood that this particular process is only an example, and additional or alternative processes can be carried out in other embodiments.

In this embodiment, the process includes steps 402 through 406. These steps are assumed to be performed by the first storage system 102 utilizing its modules 118 and 120.

Step 402 includes obtaining a sequence of file system operations to be performed on a cloud-enabled file system. Step 404 includes executing the sequence of file system operations as a single file system transaction. Step 406 includes maintaining a transaction log for the single file system transaction, the transaction log comprising information for one or more sub-transactions that were completed in conjunction with said executing, wherein the one or more sub-transactions correspond to at least a portion of the file system operations in the sequence The at least one of the sequence of file system operations may include multiple sub-transactions. The process depicted in FIG. 4 may further include the following steps: in response to one or more of a system reboot and a system recovery, determining that at least one sub-transaction corresponding to at least one of the sequence of file operations was not completed; and discarding the single file system transaction based on the determining. Obtaining the sequence of file system operations to be performed may include obtaining a logging descriptor for a first one of the file system operations, and wherein said maintaining the transaction log comprises updating the logging descriptor of the first file system operation based on the number of sub-transactions corresponding to the immediate subsequent file system operation. The process depicted in FIG. 4 may further include the following step: issuing a commit of the logging descriptor to said cloud-enabled file system, wherein the commit indicates a completion of the plurality of file system operations in the sequence. The cloud-enabled file system may be maintained on a local storage array and comprises at least one stub file that is indicative of a location of an object in a cloud storage system, the object comprising data related to a file previously sent from the local storage array to the cloud storage system. The process depicted in FIG. 4 may include the following steps: maintaining, by the local storage array, a first database comprising hard links corresponding to the at least one stub file; and maintaining a second database comprising at least one hard link corresponding to at least one further stub file, wherein the at least one further stub file was one of: previously deleted from said cloud-enabled file system, and previously rehydrated with data from a corresponding object in the cloud storage system. The plurality of file system operations may correspond to one of: deleting a stub file from the cloud-enabled file system; rehydrating a stub file in the cloud-enabled file system with data from an object stored in the cloud storage system; and executing an orphan management process to remove orphaned files in the cloud-enabled file system. The cloud-enabled file system may include a UFS64 file system.

Accordingly, the particular processing operations and other functionality described in conjunction with the flow diagram of FIG. 4 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to combine multiple file system operations into a single logging transaction. These and other embodiments can effectively achieve atomicity with the extension of multiple operations to address failures and/or panics that might occur at any point when the multiple operations are being executed, and also simplify the rollback mechanism as the transaction will be discarded by the system when one or more of the operations are not completed.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement host devices and storage systems with functionality for supporting multiple operations in transaction logging for a cloud-enabled file system will now be described in greater detail with reference to FIGS. 5 and 6. Although described in the context of system 100, these platforms may also be used to implement at least portions of other information processing systems in other embodiments.

Figure 5:
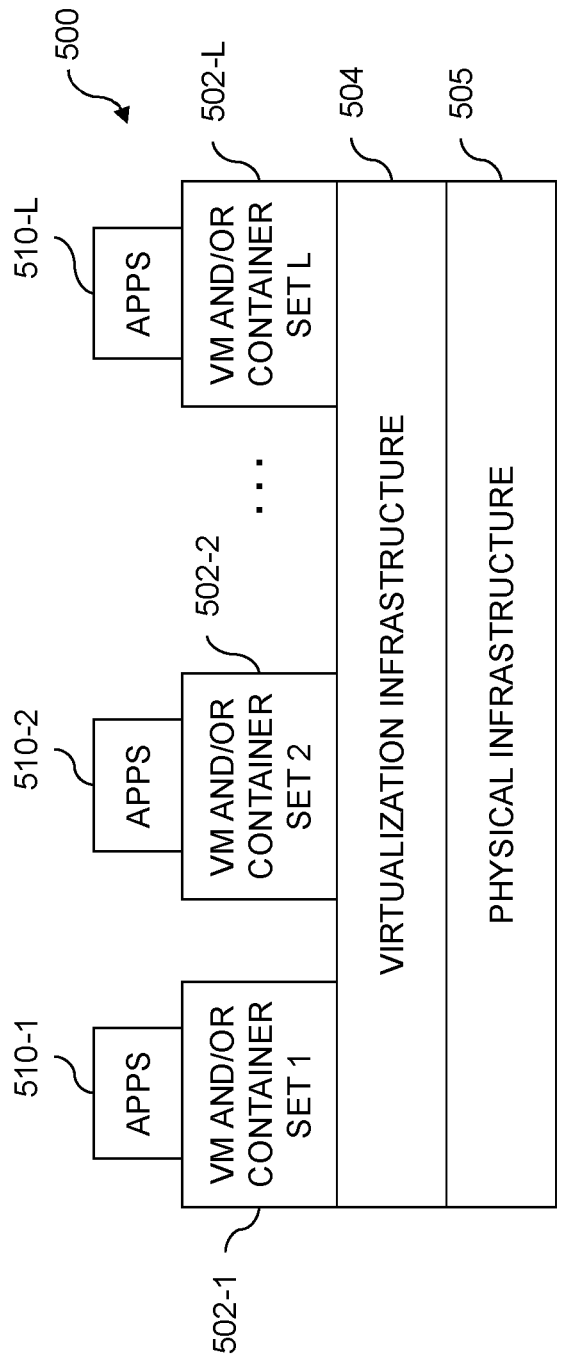
FIGS. 5 and 6 show examples of processing platforms that may be utilized to implement at least a portion of an information processing system in illustrative embodiments.
Figure 6:
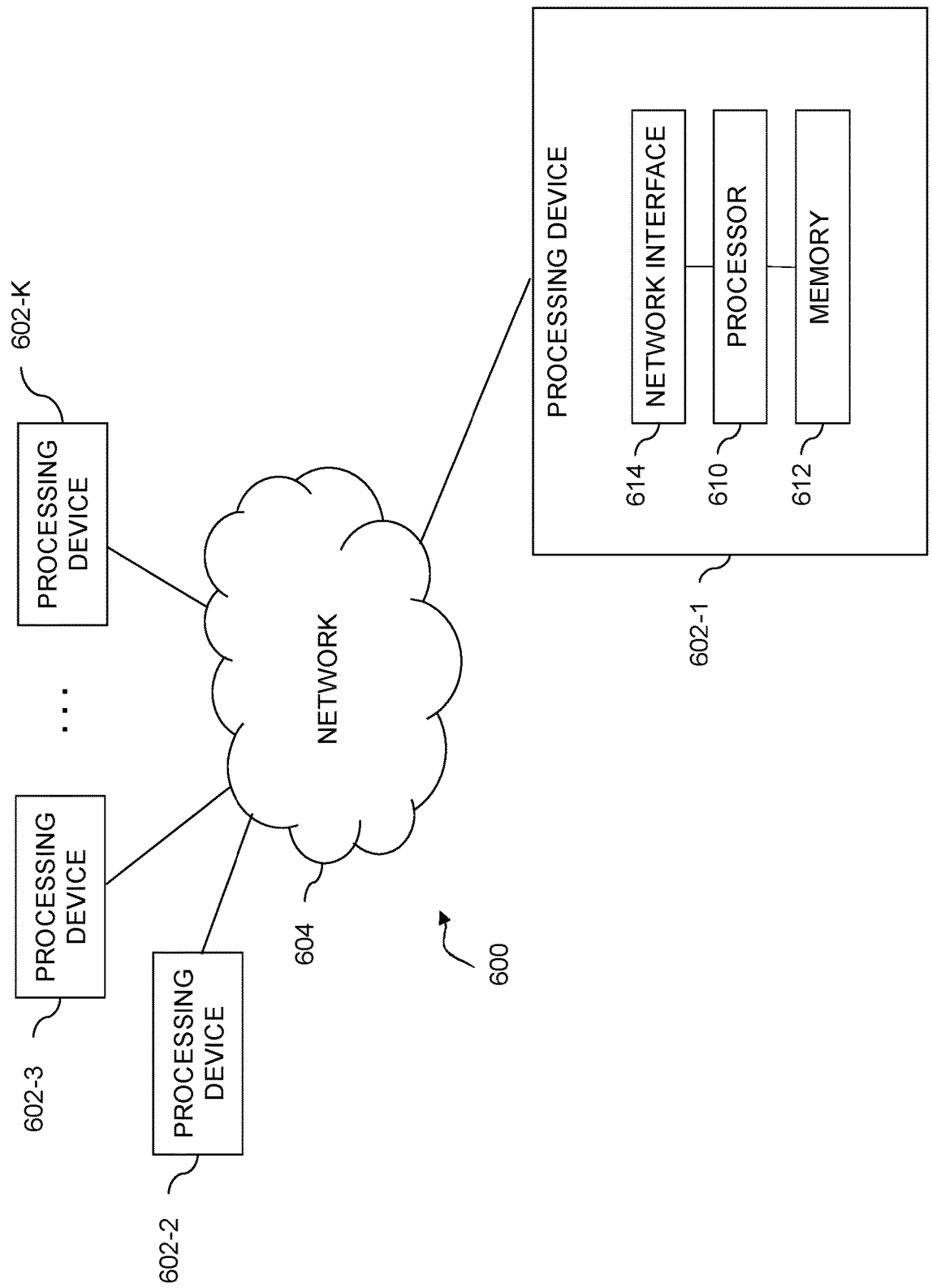

FIG. 5 shows an example processing platform comprising cloud infrastructure 500. The cloud infrastructure 500 comprises a combination of physical and virtual processing resources that may be utilized to implement at least a portion of the information processing system 100. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 may comprise respective VMs, respective sets of one or more containers, or respective sets of one or more containers running in VMs.

In some implementations of the FIG. 5 embodiment, the VMs/container sets 502 comprise respective VMs implemented using virtualization infrastructure 504 that comprises at least one hypervisor. Such implementations can provide functionality for supporting multiple operations in transaction logging for a cloud-enabled file system of the type described above using one or more processes running on a given one of the VMs. For example, each of the VMs can implement mobility logic 118, transaction logging logic 120 and/or other components for implementing functionality for supporting multiple operations in transaction logging in the first storage system 102.

A hypervisor platform may be used to implement a hypervisor within the virtualization infrastructure 504. Such a hypervisor platform may comprise an associated virtual infrastructure management system. The underlying physical machines may comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system. Such implementations can also provide functionality for supporting multiple operations in transaction logging for a cloud-enabled file system of the type described above. For example, a container host device supporting multiple containers of one or more container sets can implement one or more instances of the mobility logic 118, transaction logging logic 120, and/or other components for implementing functionality for supporting multiple operations in transaction logging for a cloud-enabled file system in the first storage system 102.

As is apparent from the above, one or more of the processing modules or other components of system 100 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, . . . 602-K, which communicate with one another over a network 604.

The network 604 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 602-1 in the processing platform 600 comprises a processor 610 coupled to a memory 612.

The processor 610 may comprise a microprocessor, a microcontroller, an application-specific integrated circuit (ASIC), a field-programmable gate array (FPGA), graphics processing unit (GPU) or other type of processing circuitry, as well as portions or combinations of such circuitry elements.

The memory 612 may comprise random access memory (RAM), read-only memory (ROM), flash memory or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure such as VxRail™, VxRack™, VxRack™ FLEX, VxBlock™ or Vblock® converged infrastructure from Dell EMC.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for supporting multiple operations in transaction logging for a cloud enabled file system as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, host devices, storage systems, storage devices, storage controllers, and other components. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising: obtaining a sequence of file system operations to be performed on a cloud-enabled file system, wherein the cloud-enabled file system is maintained on a local storage array and comprises at least one stub file that is indicative of a location of an object in a cloud storage system, the object comprising data related to a file previously sent from the local storage array to the cloud storage system;
   obtaining a logging descriptor for a first file system operation in the sequence of file system operations;
   executing the sequence of file system operations as a single file system transaction;
   maintaining a transaction log for the single file system transition, the transaction log comprising information for a plurality of sub-transactions that were completed in conjunction with said executing, wherein the plurality of sub-transactions are associated with at least the first file system operation and a second file system operation that is subsequent to the first file system operation in the sequence of file system operations, wherein at least one of the first and second file system operations comprises a sequence of multiple sub-transactions performed on metadata corresponding to the at least one stub file, and wherein said maintaining comprises updating the logging descriptor obtained for the first file system operation based on a number of sub-transactions corresponding to the second file system operation; and
   sending information to the cloud-enabled file system indicating a completion of the sequence of file system operations based at least in part on the updated logging descriptor;
   wherein the method is performed by at least one processing device comprising a processor coupled to a memory.

2. The computer-implemented method of claim 1, further comprising: in response to one or more of a system reboot and a system recovery, determining that at least one sub-transaction corresponding to at least one of the file system operations in the sequence of file system operations was not completed; and discarding the single file system transaction based on a result of the determining.

3. The computer-implemented method of claim 1, wherein the sending the information comprises issuing a commit of the updated logging descriptor to said cloud-enabled file system.

4. The computer-implemented method of claim 1, further comprising: maintaining, by the local storage array, a first database comprising hard links corresponding to the at least one stub file; and maintaining a second database comprising at least one hard link corresponding to at least one further stub file, wherein the at least one further stub file was one of: previously deleted from said cloud-enabled file system, and previously rehydrated with data from a corresponding object in the cloud storage system.

5. The computer-implemented method of claim 1, wherein the sequence of file system operations corresponds to one of: deleting a stub file from the cloud-enabled file system; rehydrating a stub file in the cloud-enabled file system with data from an object stored in the cloud storage system; and executing an orphan management process to remove orphaned files in the cloud-enabled file system.

6. The computer-implemented method of claim 1, wherein the cloud-enabled file system comprises a UFS64 file system.

7. The computer-implemented method of claim 1, wherein the sequence of multiple sub-transactions performed on the metadata corresponding to the at least one stub file comprises a first sub-transaction with the local storage array and a second sub-transaction with the cloud storage system.

8. A non-transitory processor-readable storage medium having stored therein program code of one or more software programs, wherein the program code when executed by at least one processing device causes the at least one processing device:
to obtain a sequence of file system operations to be performed on a cloud-enabled file system, wherein the cloud-enabled file system is maintained on a local storage array and comprises at least one stub file that is indicative of a location of an object in a cloud storage system, the object comprising data related to a file previously sent from the local storage array to the cloud storage system;
to obtain a logging descriptor for a first file system operation in the sequence of file system operations;
to execute the sequence of file system operations as a single file system transaction;
to maintain a transaction log for the single file system transaction, the transaction log comprising information for a plurality of sub-transactions that were completed in conjunction with said executing, wherein the plurality of sub-transactions are associated with at least the first file system operation and a second file system operation that is subsequent to the first file system operation in the sequence of file system operations, wherein at least one of the first and second file system operations comprises a sequence of multiple sub-transactions performed on metadata corresponding to the at least one stub file, and wherein said maintaining comprises updating the logging descriptor obtained for the first file system operation based on a number of sub-transactions corresponding to the second file system operation; and
to send information to the cloud-enabled file system indicating a completion of the sequence of file system operations based at least in part on the updated logging descriptor.

9. The non-transitory processor-readable storage medium of claim 8, wherein the at least one processing device is further caused: to determine, in response to one or more of a system reboot and a system recovery, that at least one sub-transaction corresponding to at least one of the file system operations in the sequence of file system operations was not completed; and to discard the single file system transaction based on a result of the determining.

10. The non-transitory processor-readable storage medium of claim 8, wherein the sending the information comprises issuing a commit of the updated logging descriptor to said cloud-enabled file system.

11. The non-transitory processor-readable storage medium of claim 8, wherein the at least one processing device is further caused:
maintain, by the local storage array, a first database comprising hard links corresponding to the at least one stub file; and
maintain a second database comprising at least one hard link corresponding to at least one further stub file, wherein the at least one further stub file was one of: previously deleted from said cloud-enabled file system, and previously rehydrated with data from a corresponding object in the cloud storage system.

12. The non-transitory processor-readable storage medium of claim 8, wherein the sequence of file system operations corresponds to one of:
deleting a stub file from the cloud-enabled file system;
rehydrating a stub file in the cloud-enabled file system with data from an object stored in the cloud storage system; and
executing an orphan management process to remove orphaned files in the cloud-enabled file system.

13. The non-transitory processor-readable storage medium of claim 8, wherein the sequence of multiple sub-transactions performed on the metadata corresponding to the at least one stub file comprises a first sub-transaction with the local storage array and a second sub-transaction with the cloud storage system.

14. An apparatus comprising: at least one processing device comprising a processor coupled to a memory; the at least one processing device being configured:
to obtain a sequence of file system operations to be performed on a cloud-enabled file system, wherein the cloud-enabled file system is maintained on a local storage array and comprises at least one stub file that is indicative of a location of an object in a cloud storage system, the object comprising data related to a file previously sent from the local storage array to the cloud storage system;
to obtain a logging descriptor for a first file system operation in the sequence of file system operations;
to execute the sequence of file system operations as a single file system transaction;
to maintain a transaction log for the single file system transaction, the transaction log comprising information for a plurality of sub-transactions that were completed in conjunction with said executing, wherein the plurality of sub-transactions are associated with at least the first file system operation and a second file system operation that is subsequent to the first file system operation in the sequence of file system operations, wherein at least one of the first and second file system operations comprises a sequence of multiple sub-transactions performed on metadata corresponding to the at least one stub file, and wherein said maintaining comprises updating the logging descriptor obtained for the first file system operation based on a number of sub-transactions corresponding to the second file system operation; and
to send information to the cloud-enabled file system indicating a completion of the sequence of file system operations based at least in part on the updated logging descriptor.

15. The apparatus of claim 14, wherein the at least one processing device is further configured: to determine, in response to one or more of a system reboot and a system recovery, that at least one sub-transaction corresponding to at least one of the file system operations in the sequence of file system operations was not completed; and to discard the single file system transaction based on a result of the determining.

16. The apparatus of claim 14, wherein the sending the information comprises issuing a commit of the updated logging descriptor to said cloud-enabled file system.

17. The apparatus of claim 14, wherein the sequence of multiple sub-transactions performed on the metadata corresponding to the at least one stub file comprises a first sub-transaction with the local storage array and a second sub-transaction with the cloud storage system.

18. The apparatus of claim 14, wherein the at least one processing device is further configured: to maintain, by the local storage array, a first database comprising hard links corresponding to the at least one stub file; and to maintain a second database comprising at least one hard link corresponding to at least one further stub file, wherein the at least one further stub file was one of: previously deleted from said cloud-enabled file system, and previously rehydrated with data from a corresponding object in the cloud storage system.

19. The apparatus of claim 14, wherein the sequence of file system operations corresponds to one of: deleting a stub file from the cloud-enabled file system; rehydrating a stub file in the cloud-enabled file system with data from an object stored in the cloud storage system; and executing an orphan management process to remove orphaned files in the cloud-enabled file system.

20. The apparatus of claim 14, wherein the cloud-enabled file system comprises a UFS64 file system.

* * * * *

UNITED STATES PATENT AND TRADEMARK OFFICE
CERTIFICATE OF CORRECTION

PATENT NO. : 11,971,855 B2
APPLICATION NO. : 16/878269
DATED : May 19, 2020
INVENTOR(S) : Priyamrita Ghosh It is certified that error appears in the above-identified patent and that said Letters Patent is hereby corrected as shown below:

In the Claims

Claim 1, Line 10, "a logging descriptor fora first file system" should read --a logging descriptor for a first file system--

Claim 1, Lines 14-15, "the single file system transition, the transaction" should read --the single file system transaction, the transaction--

Signed and Sealed this
Tenth Day of December, 2024

Katherine Kelly Vidal
*Director of the United States Patent and Trademark Office*